(12) United States Patent
Boardman et al.

(10) Patent No.: US 6,862,330 B2
(45) Date of Patent: Mar. 1, 2005

(54) SYSTEMS AND METHODS OF PRODUCING HYDROGEN USING A NUCLEAR REACTOR

(75) Inventors: Charles E. Boardman, Saratoga, CA (US); Allen E. Dubberley, Los Gatos, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/735,009

(22) Filed: Dec. 12, 2000

(65) Prior Publication Data

US 2002/0071515 A1 Jun. 13, 2002

(51) Int. Cl.$^7$ ................................................. G21G 1/02
(52) U.S. Cl. ....................... 376/323; 376/324; 202/173; 60/39.01
(58) Field of Search ................................. 376/323–325, 376/148; 202/173; 60/39.01, 39.02

(56) References Cited

U.S. PATENT DOCUMENTS

| | | | | |
|---|---|---|---|---|
| 3,821,358 A | * | 6/1974 | Interrante et al. | ........... 423/579 |
| 3,842,164 A | * | 10/1974 | Wentorf, Jr. | ................ 423/481 |
| 4,362,689 A | * | 12/1982 | Teichmann et al. | .... 204/157.41 |
| 4,370,297 A | * | 1/1983 | Teichmann | ................. 376/148 |
| 4,413,348 A | * | 11/1983 | Kapich | ....................... 376/367 |
| 4,508,677 A | | 4/1985 | Craig et al. | |
| 4,576,783 A | * | 3/1986 | Koutz | ........................ 376/323 |
| 5,030,411 A | * | 7/1991 | Cooper | ....................... 376/312 |
| 5,158,741 A | | 10/1992 | Boardman et al. | |

OTHER PUBLICATIONS

Steinberg, "The Impact of Integrated Multipurpose Nuclear Plants on the Chemical and Metallurgical Process Industries," BNL 959 (T–399), Dec. 1964.*

Schulte et al., "The Pebble Bed High Temperature Reactor as a Source of Nuclear Process Heat," JUL–1113–RG, Oct. 1974.*

Steinberg, "The Impact of Integrated Multipurpose Nuclear Plants on the Chemical and Metallurgical Process Industries," BNL 959 (T–399), Dec. 1964.*

Schulte et al. , "The Pebble Bed High Temperature Reactor as a Source of Nuclear Process Heat," JUL–1113–RG, Oct. 197407–1991.*

* cited by examiner

*Primary Examiner*—Jack Keith
*Assistant Examiner*—Rick Palabrica
(74) *Attorney, Agent, or Firm*—Armstrong Teasdale LLP

(57) ABSTRACT

A system for generating hydrogen includes a liquid metal nuclear reactor having a non-radioactive secondary heat loop, a steam generator connected to the secondary heat loop, a high temperature water cracking system, and a topping heater. The heat produced by the nuclear reactor is used to raise the temperature of the feed water for the cracking system to between about 450° C. to about 550° C. The topping heater raises the feed water temperature from the 450° C. to 550° C. range to at least 850° C. so that the cracking system can operate efficiently to produce hydrogen and oxygen.

24 Claims, 3 Drawing Sheets

SYSTEMS AND METHODS OF PRODUCING HYDROGEN USING A NUCLEAR REACTOR

BACKGROUND OF THE INVENTION

This invention relates generally to liquid metal nuclear reactors, and more particularly to using liquid metal nuclear reactors to provide energy for the production of hydrogen in a water cracking system.

Hydrogen fuel cell powered electric vehicles are being considered as a means of decreasing mobile source emissions in large cities. However, the hydrogen used in such a vehicle is typically produced using a carbon based source which causes greenhouse emissions. For example, $CO+H_2O$ is converted to $CO_2+H_2$, with the $CO_2$ being the waste byproduct of the process. It is known that $CO_2$ is one of the materials that contribute to the greenhouse effect on the environment.

Producing hydrogen with a water cracking process requires large amounts of energy because the water cracking process operate at very high temperatures, in the range of about 850° C. to 950° C., to function in an efficient manner. Nuclear reactors have been considered for a low cost heat source for water cracking systems. However, nuclear reactors do not operate at the high temperatures needed for efficient operation of these water cracking systems. Liquid metal cooled nuclear reactors operate at about 550° C. and light water reactors operate at about 285° C. which are much lower than the 850° C. to 950° C. needed for an efficient water cracking system.

It would be desirable to provide a system for supplying a sufficient amount of low cost heat to efficiently operate a water cracking system in the range of about 850° C. to 950° C.

BRIEF SUMMARY OF THE INVENTION

In an exemplary embodiment of the present invention, a system for generating hydrogen includes a liquid metal nuclear reactor having a non-radioactive secondary heat loop, a steam generator connected to the secondary heat loop, a high temperature water cracking system, and a topping heater.

The heat produced by the nuclear reactor is used to raise the temperature of the feed water for the cracking system to between about 450° C. to about 550° C. The topping heater raises the feed water temperature from the 450° C. to 550° C. range to at least 850° C. so that the cracking system can operate efficiently to produce hydrogen and oxygen. Additionally, the topping heater provides heat energy needed to disassociate the feed water into hydrogen and oxygen.

In one embodiment, the topping heater is a gas fired heater. A portion of the oxygen and hydrogen produced by the high temperature water cracking system is used as fuel in the topping heater. The exhaust from the gas fired topping heater is directed to a regenerative heat exchanger. The regenerative heat exchanger is located in the feed water supply line and is positioned between the steam generator and the topping heater. The exhaust from the gas fired topping heater is then directed to a second regenerative heat exchanger which is used to increase the temperature of a portion of the feed water that has been converted to steam by the steam generator before it enters a steam turbine generator assembly for generating electricity.

The above described system produces a sufficient amount of low cost heat to efficiently operate a water cracking system by utilizing a liquid metal nuclear reactor operating at normal operational temperatures and a topping heater. The topping heater raises the temperature of steam generated from the heat produced by the nuclear reactor to the desired cracking system operating temperature.

DETAILED DESCRIPTION OF THE INVENTION

Figure 1:
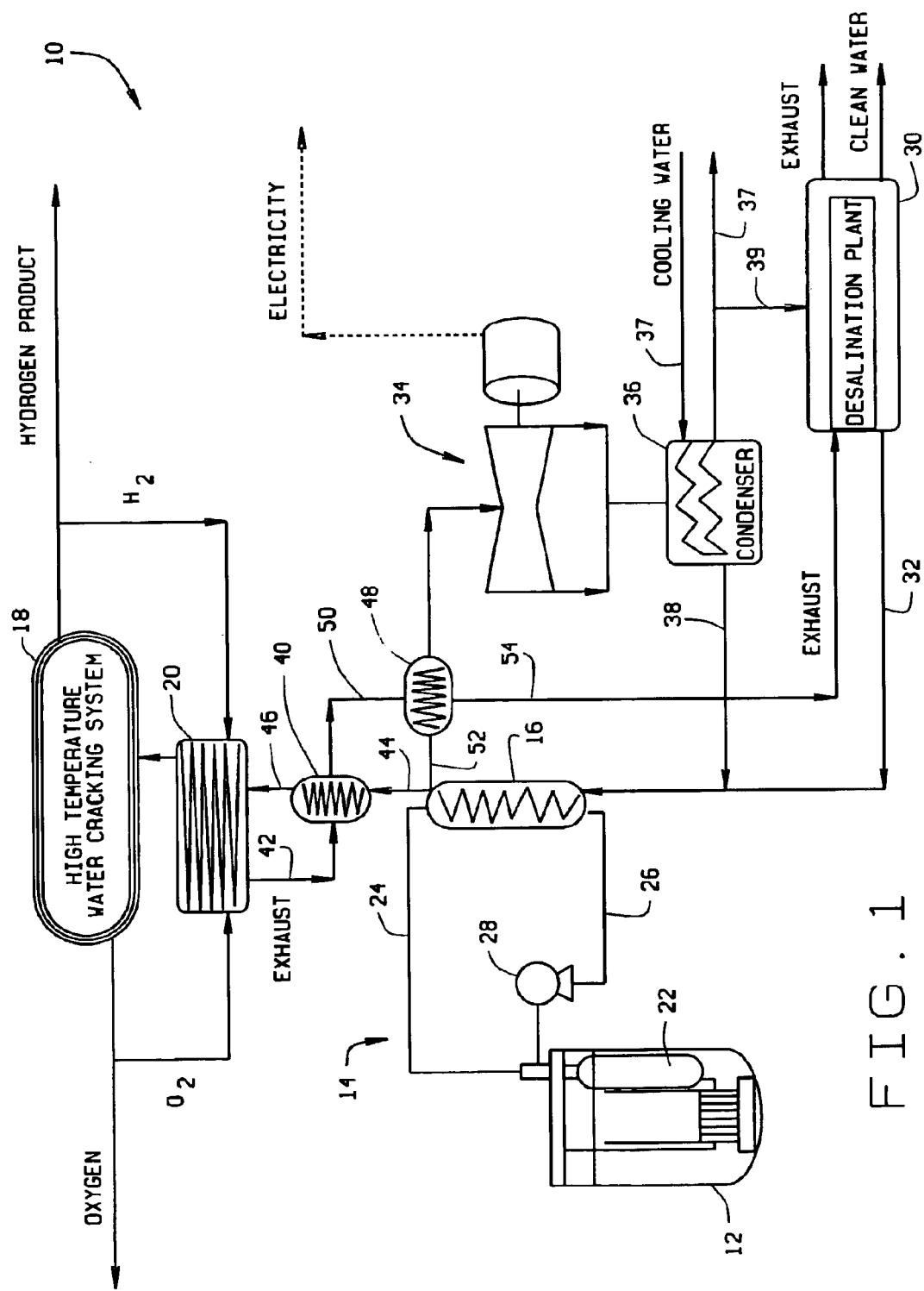
FIG. 1 is a schematic illustration of a system for producing hydrogen that includes a gas fired topping heater in accordance with an embodiment of the present invention.

FIG. 1 is a schematic illustration of a system 10 for producing hydrogen in accordance with an embodiment of the present invention. System 10 includes a liquid metal nuclear reactor 12 that includes a non-radioactive secondary loop 14 for extracting heat from reactor 12, a steam generator 16 connected to secondary heat loop 14, a high temperature water cracking system 18, and a topping heater 20.

Reactor 12 can be any known liquid metal nuclear reactor such as the reactors described in U.S. Pat. Nos. 4,508,677 and 5,158,471. Secondary loop 14 is coupled to an intermediate heat exchanger 22 in reactor 12. Secondary loop 14 includes a hot leg 24 and a cold leg 26. Secondary loop 14 includes a heat transfer medium such as helium or a liquid metal, for example, sodium, to transfer heat from intermediate heat exchanger 22 to a steam generator 16. The heat transfer medium, heated in intermediate heat exchanger 22, flows through hot leg 24 to steam generator 16, where the heat is used to generate steam, which lowers the temperature of the heat transfer medium. The heat transfer medium then flows back to intermediate heat exchanger 22 through cold leg 26. A circulation pump 28 moves the heat transfer medium through secondary loop 14. The temperature of the heat transfer medium leaving intermediate heat exchanger 22 is between about 450° C. to about 550° C.

System 10 includes a feed water source 30 which is coupled to steam generator 16 by a feed water line 32. Feed water source 30 can be, for example, a body of water, a desalination plant, a water clean-up system, a steam turbine condenser, or a combination thereof. The water from feed water source 30 is heated in steam generator 16 and converted to steam. A portion of the heated feed water, or steam, from steam generator 16 is directed to cracking system 18 and a portion of the steam is directed to a steam turbine and generator assembly 34. A condenser 36 is coupled to steam turbine and generator assembly 34. The spent steam from steam turbine 34 is condensed in condenser 36. A condenser output line 38 is connected to feed water line 32 50 that the condensed steam can be added to the feed water. Condenser 36 includes water circulating lines 37, and a water line 39 connects water circulating lines 37 with desalination plant 30 to supply make-up water to plant 30.

Figure 2:
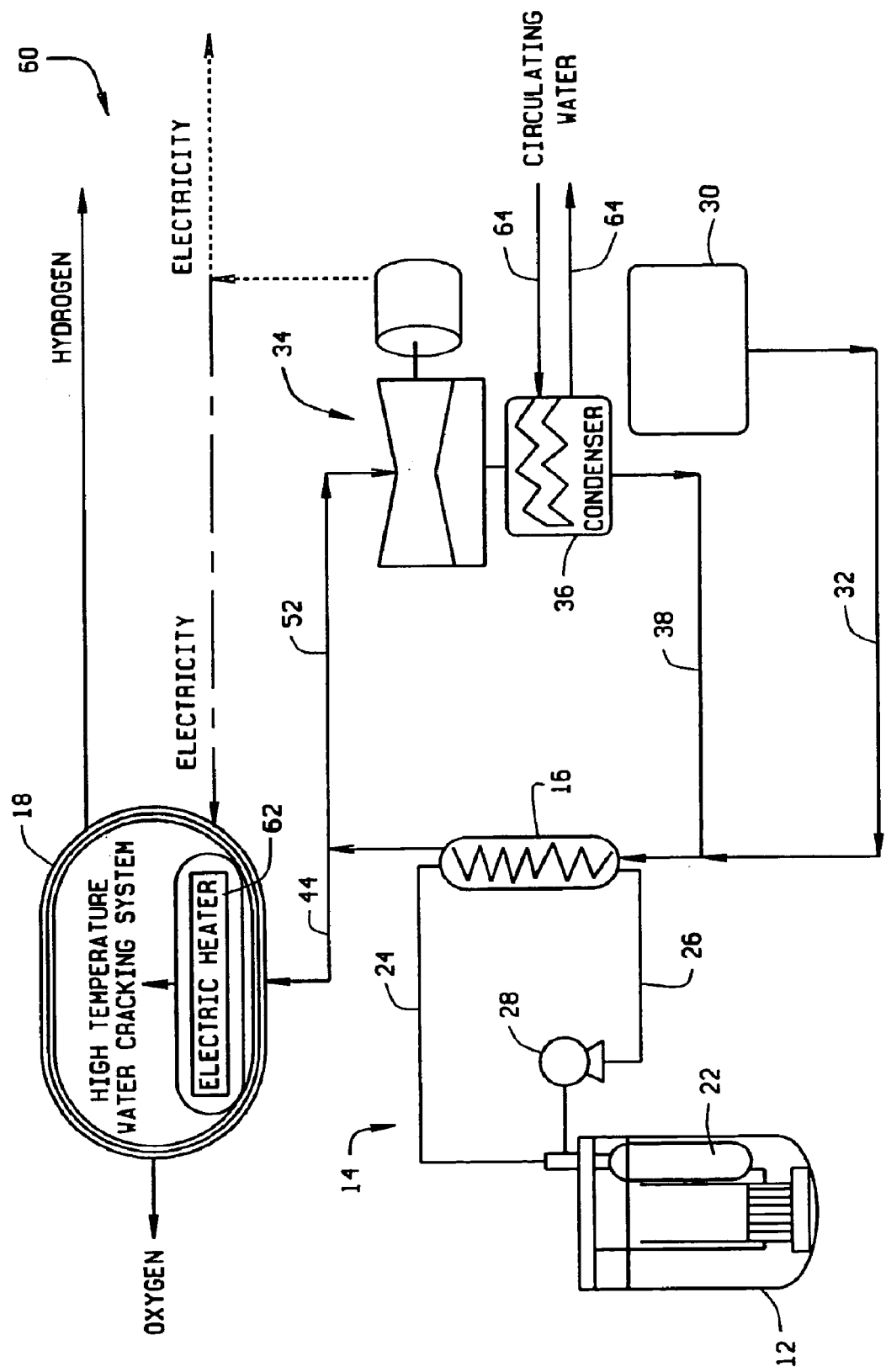
FIG. 2 is a schematic illustration of a system for producing hydrogen that includes an electric topping heater in accordance with another embodiment of the present invention.
Figure 3:
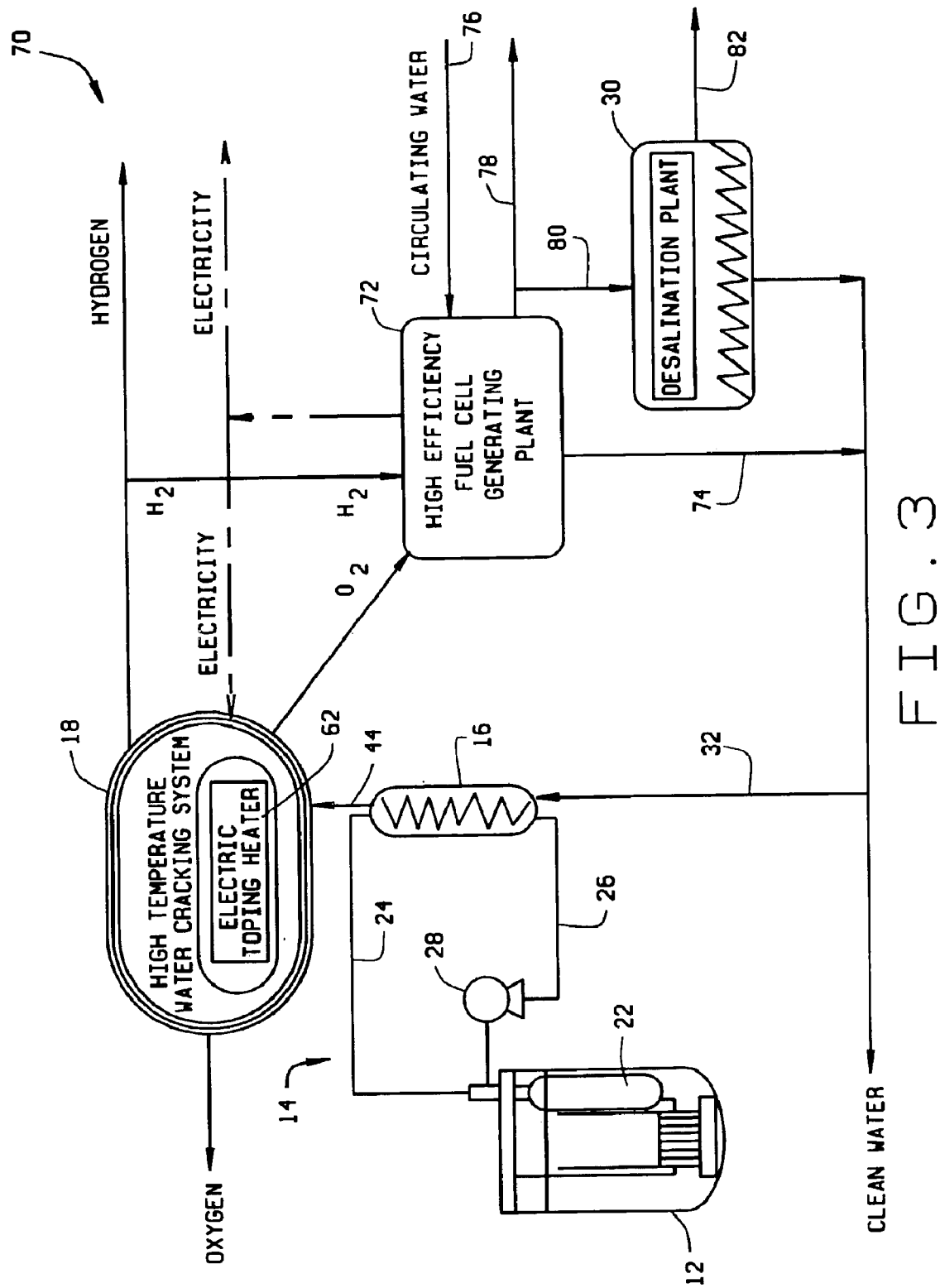
FIG. 3 is a schematic illustration of a system for producing hydrogen that includes an electric topping heater and a electricity producing fuel cell system in accordance with another embodiment of the present invention.

Topping heater 20 is a gas fired heater. However, in alternative embodiments, as shown in FIGS. 2 and 3, topping heater 20 can be an electric heater. A portion of the oxygen and hydrogen produced in water cracking system 18 is directed to topping heater 20 and used as fuel for heater 20. Exhaust from gas fired topping heater 20 is directed to a regenerative heat exchanger 40 through exhaust line 42. Regenerative heat exchanger 40 further heats the portion of the steam output from steam generator 16 that is directed to cracking system 18. A steam line 44 connects regenerative heat exchanger 40 to steam generator 16. The output from regenerative heat exchanger 40 is directed to topping heater 20 through a steam line 46. Topping heater 20 heats the output from regenerative heat exchanger 40 to at least 850° C. High temperature water cracking system 18 uses the steam heated to at least 850° C. as a feed to produce oxygen and hydrogen. Water cracking system 18 can be any known high temperature water cracking system that uses heat energy to disassociate water into hydrogen and oxygen.

To fully utilize the heat energy of gas fired topping heater 20, the exhaust from regenerative heat exchanger 40 is directed to another regenerative heat exchanger 48 through an exhaust line 50. Regenerative heat exchanger 48 is located in a steam line 52 connecting steam generator 16 and steam turbine and generator assembly 34. The exhaust from regenerative heat exchanger 48 is directed through an exhaust line 54 to water feed source 30. In this embodiment, water feed source is a desalination plant that provides feed water and water for sale.

FIG. 2 is a schematic illustration of a system 60 for producing hydrogen in accordance with another embodiment of the present invention. System 60 includes a liquid metal nuclear reactor 12 that includes a non-radioactive secondary loop 14 for extracting heat from reactor 12, a steam generator 16 connected to secondary heat loop 14, a high temperature water cracking system 18, and a topping heater 62.

As described above in system 10, secondary loop 14 is coupled to intermediate heat exchanger 22 in reactor 12, and includes a hot leg 24, a cold leg 26, and a circulation pump 28. System 60 also includes feed water source 30 coupled to steam generator 16 by a feed water line 32. In this embodiment, feed water source 30 is a desalination plant, however, feed water source can be, for example, a body of water, a desalination plant, a water clean-up system, a steam turbine condenser, or a combination thereof. A portion of the heated feed water, or steam, from steam generator 16 is directed to cracking system 18 through steam line 44 and a portion of the steam is directed to steam turbine and generator assembly 34 through steam line 52. Condenser 36 is coupled to steam turbine and generator assembly 34, and condenser output line 38 is connected to feed water line 32 so that the condensed steam can be added to the feed water. Condenser 36 includes water circulating lines 64.

Topping heater 62 is an electric heater located inside water cracking system 18 and in contact with the heated feed water or steam. Topping heater 62 heats the steam from steam generator 16 to at least 850° C. in water cracking system 18 and adds additional heat needed to disassociate the steam into hydrogen and oxygen. A portion of the electricity produced by steam turbine and generator assembly 34 is used to power electric toping heater 62.

FIG. 3 is a schematic illustration of a system 70 for producing hydrogen in accordance with another embodiment of the present invention. System 70 is similar to system 60 described above except that steam turbine and generator assembly 34 and condenser 36 are replaced by a electricity producing fuel cell facility 72. Also, because system 70 does not include steam turbine 34, all steam generated in steam generator 16 is directed to water cracking system 18 through steam line 44.

A portion of the oxygen and hydrogen produced by water cracking system 18 is used to produce electricity in fuel cell facility 72. Water is a byproduct of electricity production in fuel cell facility 72. This byproduct water is directed to feed water line 32 through an output water line 74. Fuel cell facility 72 includes water circulating lines 76 and 78. Also, a water line 80 connects water circulating line 78 with desalination plant 30 to supply heated make-up water to plant 30. A waste water line 82 removes the brackish waste water from desalination plant 30.

The above described systems 10, 60, and 70 produce a sufficient amount of low cost heat to efficiently operate a water cracking system 18 by utilizing a liquid metal nuclear reactor 12 operating at normal operational temperatures and topping heaters 20 and 62. Topping heaters 20 and 62 raise the temperature of steam generated from the heat produced by nuclear reactor 12 to the desired cracking system operating temperature. The use of water cracking system 18, with heat supplied by nuclear reactor 12 and topping heaters 20 and 60, to produce hydrogen eliminates the green house emissions typically created when hydrogen is produced using a carbon based source.

While the invention has been described in terms of various specific embodiments, those skilled in the art will recognize that the invention can be practiced with modification within the spirit and scope of the claims.

What is claimed is:

1. A system for generating hydrogen comprising:
   feed water;
   a liquid metal nuclear reactor having a non-radioactive secondary heat loop comprising a recirculated heat transfer medium;
   a steam generator connected to said secondary heat loop, said heat transfer medium and said feed water passing through said steam generator, said steam generator capable of raising the temperature of said feed water;
   a high temperature water cracking system, said feed water coupled to said water cracking system by a feed water input line, said secondary heat loop arid said recirculated heat transfer medium being separate from said high temperature water cracking system; and
   a topping heater, said topping heater capable of raising the temperature of said feed water so that said feed water in said high temperature water cracking system is at least about 850° C., said feed water input line coupled in flow communication with said steam generator, said topping heater, and said high temperature water cracking system, said feed water disassociated into hydrogen and oxygen in said high temperature water cracking system, said high temperature water cracking system being separate from any secondary heat loop of said liquid metal nuclear reactor.

2. A system in accordance with claim 1 wherein said feed water comprises output from at least one of a desalination plant, a water clean-up system, and a steam turbine condenser.

3. A system in accordance with claim 1 wherein said water feed input line is coupled to said steam generator, said steam generator raises the temperature of said feed water to between about 450° C. to about 500° C.

4. A system in accordance with claim 3 wherein said feed water is coupled to said topping heater downstream from said steam generator, said topping heater raises the temperature of said feed water to at least 850° C.

5. A system in accordance with claim 1 wherein said topping heater comprises a gas fired heater.

6. A system in accordance with claim 5 further comprising a topping heater fuel, said topping heater fuel comprises a portion of said oxygen and hydrogen disassociated from said feed water in said high temperature water cracking system.

7. A system in accordance with claim 5 further comprising a first regenerative heat exchanger and a topping heater exhaust line, said exhaust line coupled to said first regenerative heat exchanger to direct exhaust from said gas fired topping heater into said first regenerative heat exchanger, said feed water input line coupled to said first regenerative heat exchanger downstream of said steam generator.

8. A system in accordance with claim 7 further comprising a first regenerative heat exchanger exhaust line, said first regenerative heat exchanger exhaust line coupled to a desalination plant to direct exhaust from said gas fired topping heater to said desalination plant after passing through said first regenerative heat exchanger.

9. A system in accordance with claim 7 further comprising a second regenerative heat exchanger and a first regenerative heat exchanger exhaust line, said first regenerative heat exchanger exhaust line coupled to said second regenerative heat exchanger to direct exhaust from said gas fired topping heater to said second regenerative heat exchanger after passing through said first regenerative heat exchanger.

10. A system in accordance with claim 9 further comprising a steam turbine and generator assembly, and a steam line, said steam line extending from said steam generator through said second regenerative heat exchanger to said steam turbine to direct a portion of an output of said steam generator through said second regenerative heat exchanger and to said steam turbine and generator assembly.

11. A system in accordance with claim 1 further comprising a steam turbine and generator assembly, and a steam line, said steam line extending from said steam generator to said steam turbine to direct a portion of an output of said steam generator to said steam turbine and generator assembly to generate electricity.

12. A system in accordance with claim 11 wherein said topping heater comprises an electric heater, and a portion of said electricity generated by said steam turbine and generator assembly is used power said electric topping heater.

13. A system in accordance with claim 1 further comprising an electricity producing fuel cell facility, and said topping heater comprises an electric heater, a portion of hydrogen and oxygen produced by said high temperature water cracking system is used as fuel in said electricity producing fuel cell, a portion of electricity produced by said fuel cell facility is used to power said electric topping heater, and water produced by said fuel cell facility is used as an addition to said feed water for said high temperature water cracking system.

14. A system for generating hydrogen comprising:
   feed water;
   a liquid metal nuclear reactor having a non-radioactive secondary heat loop comprising a recirculated heat transfer medium;
   a steam generator connected to said secondary heat loop, said heat transfer medium and said feed water passing through said steam generator, said steam generator capable of raising the temperature of said feed water to between about 450° C. to about 500° C.;
   a high temperature water cracking system, said feed water coupled to said water cracking system by a feed water input line, said secondary heat loop and said recirculated heat transfer medium being separate from said high temperature water cracking system; and
   a topping heater, said topping heater capable of raising the temperature of said feed water so that said feed water in said high temperature water cracking system is at least about 850° C., said feed water input line coupled in flow communication with said steam generator, said topping heater, and said high temperature water cracking system, said feed water disassociated into hydrogen and oxygen in said high temperature water cracking system, said high temperature water cracking system being separate from any secondary heat loop of said liquid metal nuclear reactor.

15. A system in accordance with claim 14 wherein said feed water comprises output from at least one of a desalination plant, a water clean-up system, and a steam turbine condenser.

16. A system in accordance with claim 14 wherein said topping heater comprises a gas fired heater.

17. A system in accordance with claim 16 further comprising a topping heater fuel, said topping heater fuel comprises a portion of said oxygen and hydrogen disassociated from said feed water in said high temperature water cracking system.

18. A system in accordance with claim 16 further comprising a first regenerative heat exchange and a topping heater exhaust line, said exhaust line coupled to said first regenerative heat exchanger to direct exhaust from said gas fired topping heater into said first regenerative heat exchanger, said feed water input line coupled to said first regenerative heat exchanger downstream of said steam generator.

19. A system in accordance with claim 18 further comprising a first regenerative heat exchanger exhaust line, said first regenerative heat exchanger exhaust line coupled to a desalination plant to direct exhaust from said gas fired topping heater said desalination plant after passing through said first regenerative heat exchanger.

20. A system in accordance with claim 18 further comprising a second regenerative heat exchanger and a first regenerative heat exchanger exhaust line, said first regenerative heat exchanger exhaust line coupled to said second regenerative heat exchanger to direct exhaust from said gas fired topping heater to said second regenerative heat exchanger after passing through said first regenerative heat exchanger.

21. A system in accordance with claim 20 further comprising a steam turbine and generator assembly, and a steam line, said steam line extending from said steam generator through said second regenerative heat exchanger to said steam turbine to direct a portion of an output of said steam generator through said second regenerative heat exchanger and to said steam turbine and generator assembly.

22. A system in accordance with claim 14 further comprising a steam turbine and generator assembly, and a steam line, said steam line extending from said steam generator to said steam turbine to direct a portion of an output of said steam generator to said steam turbine and generator assembly to generate electricity.

23. A system in accordance with claim 22 wherein said topping heater comprises an electric heater, and a portion of said electricity generated by said steam turbine an assembly is used to power said electric topping heater.

24. A system in accordance with claim 14 further comprising an electricity producing fuel cell facility, and said topping heater comprises an electric heater, a portion of hydrogen and oxygen produced by said high temperature water cracking system is used as fuel in said electricity producing fuel cell, a portion of electricity produced by said fuel cell facility is used to power said electric topping heater, and water produced by said fuel cell facility is used as an addition to said feed water for said high temperature water cracking system.

* * * * *

UNITED STATES PATENT AND TRADEMARK OFFICE
CERTIFICATE OF CORRECTION

PATENT NO. : 6,862,330 B2
APPLICATION NO. : 09/735009
DATED : March 1, 2005
INVENTOR(S) : Boardman et al.

It is certified that error appears in the above-identified patent and that said Letters Patent is hereby corrected as shown below:

Column 4, line 38, delete "loop arid said" and insert therefor -- loop and said --.
Column 4, line 59, delete "about 500°C" and insert therefor -- about 550°C --.

Column 5, line 37, between "used" and "power" insert -- to --.

Column 5, line 55, delete "about 500°C" and insert therefor -- about 550°C --.

Column 6, line 19, delete "heat exchange" and insert therefor -- heat exchanger --.

Signed and Sealed this

Twentieth Day of November, 2007

JON W. DUDAS
*Director of the United States Patent and Trademark Office*

UNITED STATES PATENT AND TRADEMARK OFFICE
CERTIFICATE OF CORRECTION

PATENT NO. : 6,862,330 B2 Page 1 of 1
APPLICATION NO. : 09/735009
DATED : March 1, 2005
INVENTOR(S) : Boardman et al.

It is certified that error appears in the above-identified patent and that said Letters Patent is hereby corrected as shown below:

Column 4, line 38, delete "loop arid said" and insert therefor -- loop and said --.
Column 4, line 59, delete "about 500°C" and insert therefor -- about 550°C --.
Column 5, line 37, between "used" and "power" insert -- to --.
Column 5, line 55, delete "about 500°C" and insert therefor -- about 550°C --.
Column 6, line 19, delete "heat exchange" and insert therefor -- heat exchanger --.

Signed and Sealed this

Eighteenth Day of December, 2007

JON W. DUDAS
*Director of the United States Patent and Trademark Office*